United States Patent Office 3,113,141
Patented Dec. 3, 1963

3,113,141
1-NITRO-2,6-DIFLUOROANTHRAQUINONE
George N. Valkanas and Heinrich Hopff, Zurich, Switzerland, assignors to Stauffer Chemical Company, a corporation of Delaware
No Drawing. Filed Mar. 29, 1961, Ser. No. 99,019
1 Claim. (Cl. 260—384)

This invention relates to certain novel compositions of matter and more particularly relates to 1-nitro mono- and difluoroanthraquinones. The aminofluoroanthraquinones are well known as dyestuffs and it is the object of the present invention to provide certain intermediates for the preparation of the aminofluoroanthraquinones so that these materials will be available in a more direct method and at a lower cost than heretofore.

In accordance with the present invention, the 1-nitro mono- and difluoroanthraquinones are made by nitrating fluoroanthraquinones utilizing either nitric acid or a combination of another acid such as sulfuric acid with a nitro salt such as sodium nitrate. In accordance with the process of the present invention, the following typical compounds have been synthesized:

1-nitro 2,6-difluoroanthraquinone;
1-nitro 6-fluoroanthraquinone;
1-nitro 4,8-difluoroanthraquinone;
1-nitro 5-fluoroanthraquinone; and
1-nitro 4-fluoroanthraquinone.

The reaction may be conducted by preparing a mixture of a fluorinated anthraquinone together with sulfuric acid and sodium nitrate. The reaction goes successfully at temperatures of from about 0° C. to about 40° C. and, generally speaking, reaction times will vary from about two hours to about twelve hours or more. It is generally preferred to operate at lower temperatures, such as from 0° C. to 5° C., since higher temperatures sometimes lead to the production of hydrolyzable products which are undesired. In many instances, it is advantageous to initiate the reaction at a low temperature and to raise the temperature as the reaction proceeds. After the reaction is substantially complete, the nitrofluoroanthraquinones can be purified by known methods such as recrystallization from chlorobenzene.

The following non-limiting examples illustrate methods by which the compounds of the present invention can be made.

Example I.—1-Nitro 6-Fluoroanthraquinone

A quantity of ten grams of 2-fluoroanthraquinone was dissolved in 100 cc. of concentrated sulfuric acid. The solution was cooled to 0° C. and a quantity of 3.8 grams of dried sodium nitrate was added to the solution while the solution was stirred. The solution was stirred for a period of 10 hours and then was allowed to stand overnight at room temperature. The following day, the solution was heated to 40° C. for two hours and then poured over ice. The precipitate was recrystallized from chlorobenzene to give a yield of 8.2 grams of 1-nitro 6-fluoroanthraquinone, M.P. 222°–223° C.

Example II.—1-Nitro 2,6-Difluoroanthraquinone

Ten grams of 2,6-difluoroanthraquinone prepared as set forth in application Serial No. 10,870, filed February 25, 1960, now abandoned, was nitrated in sulfuric acid solution utilizing 3.5 grams of sodium nitrate. The solution was stirred and maintained at a temperature of 0° C. for a period of 10 hours and then was allowed to rise to room temperature and maintained at this temperature for 15 hours. The solution was poured over ice and the precipitate was recrystallized from chlorobenzene. A yield of 7.3 grams of 1-nitro 2,6-difluoroanthraquinone was obtained, M.P. 207°–209° C.

Example III.—1-Nitro 5-Flouroanthraquinone

Ten grams of 1-fluoroanthraquinone was dissolved in 100 cc. of sulfuric acid and 3.7 grams of sodium nitrate was added to the solution while it was maintained at 0° C. under stirring. The reaction mixture was stirred for a period of 10 hours at 0° C. and then was maintained without stirring for 15 hours at a temperature of 10° C. Again the solution was poured over ice and the precipitate recrystallized from chlorobenzene to yield 6.7 grams of 1-nitro 5-fluoroanthraquinone, M.P. 213°–214° C.

Example IV.—1-Nitro 4,8-Difluoroanthraquinone

A quantity of 10 grams of 1,5-difluoroanthraquinone prepared as set forth in application Serial No. 10,870 filed February 25, 1960, now abandoned, was nitrated in the same manner as Example III. The product, when recrystallized from chlorobenzene, had a melting point of 253°–240° C. and the yield was 6.4 grams.

The above nitrofluoroanthraquinones can be readily reduced using known methods to produce the corresponding aminofluoroanthraquinones. For instance, a weighed sample of 1-nitro 6-fluoroanthraquinone was ground to a paste with twice the quantity of sodium sulfite and suspended in hot water and maintained at a temperature of 70°–80° C. under stirring for 40 minutes. A crop of brick red needles of 1-amino 6-fluoroanthraquinone having a melting point of 199°–200° C. was obtained. The other compounds can be reduced to valuable dyestuffs in substantially the same manner.

Obviously, other methods of reducing the nitrofluoroanthraquinones can be used, such as catalytic hydrogenation with Raney nickel or platinum black.

We claim:
1-nitro 2,6-difluoroanthraquinone.

References Cited in the file of this patent
UNITED STATES PATENTS 2,720,533    Jenny et al.             Oct. 11, 1955
2,891,074    Scherer et al.           June 16, 1959

OTHER REFERENCES

Houben: "Das Anthracen und die Anthraquinone" (1929), pages 288 and 289.